(12) United States Patent
Schillaci

(10) Patent No.: US 6,499,680 B2
(45) Date of Patent: Dec. 31, 2002

(54) GRINDING MEDIA

(75) Inventor: Sam P. Schillaci, Grand Island, NY (US)

(73) Assignee: Saint-Gobain Ceramics and Plastics, Inc., Worcester, MA (US)

(*) Notice: Subject to any disclaimer, the term of this patent is extended or adjusted under 35 U.S.C. 154(b) by 41 days.

(21) Appl. No.: 09/873,171

(22) Filed: Jun. 1, 2001

(65) Prior Publication Data

US 2002/0179755 A1 Dec. 5, 2002

(51) Int. Cl.[7] ............................................. B02C 17/18
(52) U.S. Cl. ................................... 241/30; 241/184
(58) Field of Search .................................... 241/30, 184

(56) References Cited

U.S. PATENT DOCUMENTS 5,641,469 A * 6/1997 Garg et al. ................. 423/625
6,264,710 B1 * 7/2001 Erickson ................. 264/172.14

OTHER PUBLICATIONS

US Drum Handling Blending and Mixing Equipment Product Bulletin of Norton Chemical Process Products Corp. which was published before the date of invention.

* cited by examiner

*Primary Examiner*—Mark Rosenbaum
(74) *Attorney, Agent, or Firm*—David Bennett

(57) ABSTRACT

Alpha alumina milling media made by a sol-gel process have improved utility in milling alumina materials in a bead mill.

3 Claims, No Drawings

GRINDING MEDIA

BACKGROUND OF THE INVENTION

This invention relates to grinding media used in mills for comminuting solid materials, typically ceramics. Such mills include those in which rotating or tumbling cylinders are charged with milling media and the material to be comminuted and the frequent contacts between the media and the material brings about comminution. For simplicity of reference all such mills are hereinafter referred to as "bead mills".

There are several types of bead mill operating on this general principle available in commerce. Some are oriented vertically and may be equipped with agitators and others are oriented with the cylindrical axis horizontal. All however are designed to create frequent comminuting contacts between the media and the material.

This mode of operation puts great emphasis on the media and typically four different kinds of media are in commercial use today. Each however is conventionally supplied in the form of short cylinders about a centimeter long with a centimeter diameter though larger and smaller media are available for use with larger or smaller mills than the conventional and shapes other than cylindrical such as spheres can be used.

A key element in the selection of the media to be employed is the material from which they are made. As indicated above, four different materials are in common use: steel, pure alpha alumina, 84% alpha alumina, and zirconia which may be stabilized in the tetragonal form using for example yttria or one of the other known stabilizing additives. Each has its special applications in which it is most widely used determined largely by its properties. Each however also has problems that make it unsuitable for some applications. This is usually strongly influenced by the intended use of the comminuted material and its sensitivity to impurities of composition or to departures from the desired particle size distribution of the comminuted product. It is understood of course that comminution using milling media not only leads to fracture of the material being milled but also to some degree, fracture of the media themselves. Thus the final product will contain some fragments derived not from the material being comminuted but also from the media and this can lead to problems. Steel for example can not be used where metal fragments would interfere with a powder property and could not be separated easily. Zirconia is very tough and does not suffer much loss by attrition but is not generally efficient at milling alumina where alumina media are typically used because the attrited material is largely the same as the material being milled. Alumina media are made by sintering fine alumina powder under high pressure and high temperature conditions. Such products have essentially zero porosity and theoretical density and are very effective in the comminution of alumina where they have the advantage of being chemically the same as the material to be comminuted. However with high purity alumina, (93%+), media fracture during use produces fragments that are unacceptably large if the objective is to produce micron-sized, or finer, alumina powders. On the other hand with the lower purity alumina media fracture, if it occurs at all, produces microchips of a size compatible with the desired final product. However such media contain a significant amount of silica and this can be an unacceptable contaminant in some applications.

There is therefore a significant need for media suitable for use in comminuting alumina which fracture if at all in acceptable fragments and which contain essentially no impurities.

DESCRIPTION OF THE INVENTION

The present invention provides milling media consisting essentially of alpha alumina made by a seeded sol-gel process.

Alumina made by the seeded sol-gel process is characterized by a uniform crystalline structure in which the crystals have an average diameter of not more than about 2 microns. The average diameter is that measured using the corrected intercept technique in which diagonal lines are drawn across a polished SEM micrograph cross-section and the total lengths of the lines is divided by the number of crystals intersected by the lines and the result is multiplied by 1.5 to give the true average diameter of the crystals. Preferred media according to the invention have crystals of alpha alumina with average diameters of one micron or less such as from 0.1 micron up to 1 micron.

The sol-gel process typically begins with a boehmite sol which is then seeded with a material that will promote the formation of alpha alumina when heated to a sufficiently elevated temperature. Suitable materials are usually isostructural with alpha alumina with lattice dimensions that are closely similar. The obvious and most frequently used such seed material is of course alpha alumina itself in the form of fine sub-micron-sized particles. The sol with the seed uniformly dispersed therein is then gelled and dried and calcined to remove water and produce an intermediate precursor form of alpha alumina before this is sintered to produce alpha alumina.

The alumina may have incorporated therein minor amounts of modifying ceramic oxides either as addition to the gel or by infiltration of the alpha alumina precursor using a precursor of the ceramic oxide while the intermediate is still in the porous state. The amount of such modifying ceramic oxides in the final alumina can be as much as 5% by weight without detracting from the essentially alpha alumina character of the media.

Sintering such a seeded sol-gel alumina to essentially theoretical density produces an alpha alumina with a Vickers hardness of at least 20 GPa, and preferably 21 Gpa, (as measured under a 500 g load), and occurs at a conversion temperature at least about 100° C. or more below the conversion temperature in the absence of seeding. Since higher temperatures encourage crystal growth, it proves possible to achieve such high densities and hardnesses without losing the fine, uniform microcrystalline structure of the alumina.

The traditional shape of the media is, as was indicated above, cylindrical and this can be secured very easily by extruding the seeded sol-gel and cutting the extrudate into appropriately sized particles before drying and firing to produce the alpha alumina form.

Remarkably however it has been found that it is not essential to adopt this form to produce the media. While cylindrical media are effective, this is also true of spherical or random shapes. Indeed particles with random shapes are equally or more effective than cylindrical in producing comminution. Such particles have a plurality of edges and corners and while it is clear these may be more effective at causing comminution, it would also be anticipated that they would in the process become rounded and lead to significant erosion of the media. In fact however, most surprisingly, the random shape of such media particles is essentially unchanged even after prolonged grinding and the weight loss is less than would be experienced by traditional cylindrical shapes in achieving the same level of comminution. Thus it is possible to use as milling media particles made with an entirely different purpose.

Seeded sol-gel alumina is very widely used to produce abrasive grits. In the commercial process for making such grits, the dried fired precursor material is comminuted to produce random shapes which are then sintered to convert to alpha alumina. This produces a wide range of particle sizes which are then sorted using sieves of increasingly finer mesh sizes. Grits falling through a sieve but being retained on the next finer sieve mesh are characterized by the grit size corresponding to the sieve on which they are retained. It is found that abrasive grit particles with sizes of 46 grit or coarser, such as 36, 24, 20, 16 or 14 grit sizes, perform very well as milling media for alumina. However theoretically much finer grit sizes such as grits as small as 50 grit could be used in some applications.

DESCRIPTION OF PREFERRED EMBODIMENTS

The effectiveness of the milling media of the invention is illustrated by the following Example which indicates the high level of efficiency of comminution achieved using the media of the invention.

EXAMPLE 1

A commercial alpha alumina, (15.8 kg), purchased from Alcoa Company was used as raw material to be milled. This alumina, which had a specific surface area, (as measured by the BET method), of 6 $m^2/gm$, (corresponding to a an average particle size of about 1 micron), was placed in a Bead Mill sold by Netzsch Inc. of Exton, Pa. under the designation "Labstar LMZ-10". This mill has a polyurethane lining to avoid contamination of the powder obtained. Seeded sol-gel alumina abrasive grits having random shapes and sold by Saint-Gobain Ceramics and Plastics Inc. as 46A grit, (0.27–0.8mm), "SG" abrasive grain, (12% by total volume charged), were used as the milling media and deionized water, (69.5% of total volume charged), was added to produce a total charge of 40.82 liters with a solids content of 30.5% by weight. Milling was then commenced.

More media were added from time to time to keep media level constant. During 21 hours of milling a total of only 3.7 kg needed to be added to maintain the media at a constant level. The automatic load control on the mill was used to maintain maximum power input consistent with keeping the temperature low enough to avoid damage to the polyurethane lining.

An alpha alumina powder with a surface area of over 120 $m^2/gm$ was obtained in just under 1200 minutes.

By contrast when the same alumina is milled in a conventional Sweco vibratory mill using conventional half inch alumina media, this level of comminution was not reached for about 6 days. While 75 kg of alumina powder was charged the product was 120 kg of alumina powder, indicating a significant of loss of media by attrition had occurred. Thus the final product contained all the impurities present in about 45 kg of the media as well as the comminuted product from the original alumina powder charged.

To assess the friability of the media, a charge of 90% of the same media described and used above was run in a Labstar Trinex mill available from Netzsch Inc. with only water added. The run lasted for two hours and after that time the media weight loss was only 3.9% which compares very favorably with conventional grinding media tested in the same way. The particles making up the 3.9% weight loss were all sub-micron in size such that it was clear no substantial coarse fracturing of the media was occurring.

From the above results it is clear that the use of seeded sol-gel alumina media in a bead mill provides an extremely efficient and advantageous milling option.

I claim:

1. A process for the milling of alpha alumina powder in a bead mill which comprises milling the powder using as the milling media particles of alpha alumina made by a seeded sol-gel process.

2. A process according to claim 1 in which the milling media are alumina particles consisting essentially of alpha alumina crystals having an average diameter of less than one micron.

3. A process according to claim 1 in which the milling media are alpha alumina particles having random shapes.

* * * * *